(12) United States Patent
Vollert et al.

(10) Patent No.: US 8,875,848 B2
(45) Date of Patent: Nov. 4, 2014

(54) METHOD AND DEVICE FOR DISPLACING AND STORING BRAKE FLUID FOR A HYDRAULIC BRAKE SYSTEM OF A VEHICLE

(75) Inventors: Herbert Vollert, Vaihingen/Enz (DE); Reinhard Weiberle, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 13/386,262

(22) PCT Filed: May 5, 2010

(86) PCT No.: PCT/EP2010/056066
§ 371 (c)(1),
(2), (4) Date: Jun. 21, 2012

(87) PCT Pub. No.: WO2011/009651
PCT Pub. Date: Jan. 27, 2011

(65) Prior Publication Data
US 2012/0255817 A1    Oct. 11, 2012

(30) Foreign Application Priority Data
Jul. 24, 2009   (DE) .......................... 10 2009 028 010

(51) Int. Cl.
| | | |
|---|---|---|
| *F16D 55/02* | (2006.01) | |
| *B60T 8/40* | (2006.01) | |
| *B60T 8/48* | (2006.01) | |
| *B60T 17/22* | (2006.01) | |
| *B60T 13/68* | (2006.01) | |

(52) U.S. Cl.
CPC ............... *B60T 8/4845* (2013.01); *B60T 8/405* (2013.01); *B60T 8/4872* (2013.01); *B60T 2201/12* (2013.01); *B60T 17/221* (2013.01); *B60T 13/686* (2013.01)

USPC .......................................... 188/71.8; 188/355

(58) Field of Classification Search
USPC ...................... 188/71.8, 355, 358, 359, 360; 303/114.1, 114.2
See application file for complete search history.

(56) References Cited

U.S. PATENT DOCUMENTS 6,419,329 B1    7/2002  Buschmann et al.
8,424,976 B2 *  4/2013  Dinkel et al. ................. 188/359
(Continued)

FOREIGN PATENT DOCUMENTS

DE    44 25 578    1/1996
DE    197 22 550   12/1998
(Continued)

OTHER PUBLICATIONS

International Search Report for PCT/EP2010/056066, dated Aug. 11, 2010.

*Primary Examiner* — Thomas J Williams
(74) *Attorney, Agent, or Firm* — Kenyon & Kenyon LLP

(57) ABSTRACT

In a method for displacing and storing brake fluid for a hydraulic brake system of a vehicle which brake system has at least one hydraulic accumulator, at least one brake booster and at least one brake circuit, the brake booster is configured in such a manner, that even without an action of the driver, actuation of the brake booster allows a volume of brake fluid to be automatically displaced. The brake fluid is displaced into the hydraulic accumulator and stored, by automatic actuation of the brake booster, and at least a portion of the stored brake fluid is emptied by the hydraulic accumulator into the brake circuit as a function of the operating state of the brake system.

11 Claims, 2 Drawing Sheets

(56) References Cited

U.S. PATENT DOCUMENTS

| | | | |
|---|---|---|---|
| 2004/0061375 A1* | 4/2004 | Drott et al. | 303/20 |
| 2008/0258546 A1* | 10/2008 | Drumm et al. | 303/115.4 |
| 2009/0183958 A1* | 7/2009 | Sano et al. | 188/204 R |

FOREIGN PATENT DOCUMENTS

| | | |
|---|---|---|
| DE | 198 60 044 | 7/1999 |
| DE | 100 60 498 | 10/2001 |
| DE | 10 2005 061 122 | 7/2006 |
| DE | 10 2006 036 675 | 11/2007 |
| DE | 10 2007 026 447 | 12/2008 |
| DE | 10 2007 062 839 | 6/2009 |
| EP | 1 455 982 | 2/2008 |
| FR | 2 828 464 | 2/2003 |
| WO | WO 2009/083216 | 7/2009 |
| WO | WO 2009/083217 | 7/2009 |

* cited by examiner

METHOD AND DEVICE FOR DISPLACING AND STORING BRAKE FLUID FOR A HYDRAULIC BRAKE SYSTEM OF A VEHICLE

BACKGROUND OF THE INVENTION

1. Field of the Invention

The present invention relates to a method and a device for displacing and storing brake fluid for a hydraulic brake system of a vehicle.

2. Description of Related Art

In a hydraulic brake system of a vehicle, a brake pedal is mostly actuated by the driver and, with the optional assistance of a brake booster, mechanically displaces a piston in a master brake cylinder, at whose outlets a hydraulic unit is connected. In this manner, brake fluid is introduced into the hydraulic unit (e.g., ESP or ABS) and directed to the wheel brake cylinders. There, the introduced volume increases the brake pressure and causes braking action by pressing the brake pads onto the brake disks.

In modern brake systems, brake calipers are often provided with an increased gap between brake pads and brake disks to reduce the friction of the brake and thereby minimize fuel consumption. This gap is set in a purely mechanical manner and is a function of, inter alia, the time of brakeless travel. For this reason, the size of the gap is not always the same. In the case of manipulating the brake pedal, this results in, inter alia, a pedal play up to the point of closing the gap, which is a function of the driving situation; and therefore, this results in a non-reproducible relationship between pedal travel and total braking torque. The pedal characteristic may be different from braking instance to braking instance.

In addition, such a gap reduces the dynamic response of a braking action, since in the event of manipulating the brake pedal, any existing gap causes the braking action to still not occur immediately.

BRIEF SUMMARY OF THE INVENTION

The present invention provides a method and a device for displacing and storing brake fluid for a hydraulic brake system of a vehicle. In this context, the brake system has at least one hydraulic accumulator, at least one brake booster and at least one brake circuit, the brake booster being developed in such a manner, that even without action of the driver, actuation of the brake booster allows a volume of brake fluid to be automatically displaced.

The essence of the present invention is that:
brake fluid is displaced into the hydraulic accumulator and stored, by automatic actuation of the brake booster; and
at least a portion of the stored brake fluid is emptied by the hydraulic accumulator into the brake circuit as a function of the operating state of the brake system.

In a specific embodiment of the present invention, a hydraulic accumulator is integrated into the brake system, the hydraulic accumulator being hydraulically connected to the master brake cylinder and the wheel brakes, in which, for example, the gap mentioned at the outset is supposed to be closed. This connection may be broken by a switchable valve. A controllable, electronic brake booster, which is advantageously a component of the brake system, may be controlled in such a manner, that it exerts force on the piston of a master brake cylinder without assistance from the driver and consequently displaces a volume in the direction of a brake circuit. If one breaks the hydraulic connection to the brake circuit and opens the hydraulic connection to the hydraulic accumulator, then volumes of brake fluid may be introduced into the accumulator. By closing the hydraulic connection, the introduced volume may be held there. If one opens the connection again, then the volume is released again and enters into the brake circuit. Now, if the brake circuit has at least one wheel brake having a gap between the brake pad and the brake disk, then at least one portion of the stored brake fluid may be discharged by the hydraulic accumulator into the brake circuit to reduce the gap. In this manner, the variable gap may be closed, irrespective of the initial size of the gap, by introducing a volume of brake fluid. In this context, it is particularly provided that the gap be reduced until a pressure increase in the brake circuit is detected and/or the driver lowers the position of the brake pedal, the pedal travel being monitored with the aid of a pedal-travel sensor.

In an advantageous refinement of the present invention, a first interrupting device is provided,
  by the closing of which, the brake pressure in the at least one brake circuit is independent of an actuation of the brake booster; and
  which is open during the emptying.
In addition, a second interrupting device may be provided, by
  the opening of which a hydraulic connection between the at least one brake circuit and the hydraulic accumulator is rendered possible, and which is configured as follows:
  The second interrupting device is opened during the emptying of the at least one portion of the stored brake fluid.
  The second interrupting device is closed during the storage.

Alternatively or in addition to the reduction of the gap, it may also be provided that at least a portion of the stored brake fluid be emptied by the hydraulic accumulator into the brake circuit to increase the dynamics of the pressure build-up in the brake circuit.

In particular, it is provided that the present invention's displacing of brake fluid into the hydraulic accumulator in driving situations, in which the driver does not brake and/or braking is unlikely, takes place, in particular, as a function of the position of a brake pedal.

Furthermore, the displacing of brake fluid into the hydraulic accumulator may take place as a function of a measured accumulator pressure, the accumulator pressure being measured by a pressure sensor at hand.

The emptying of the hydraulic accumulator according to the present invention may take place
  on the basis of driver behavior, in particular, changing the position of and/or the contact state of a brake pedal (101) of an accelerator pedal and/or
  on the basis of driving situations, particularly in the case of braking assistance, in which the brake pressure exceeds the degree predetermined by the brake pedal, or in the case of emergency braking.

DETAILED DESCRIPTION OF THE INVENTION

Figure 1:
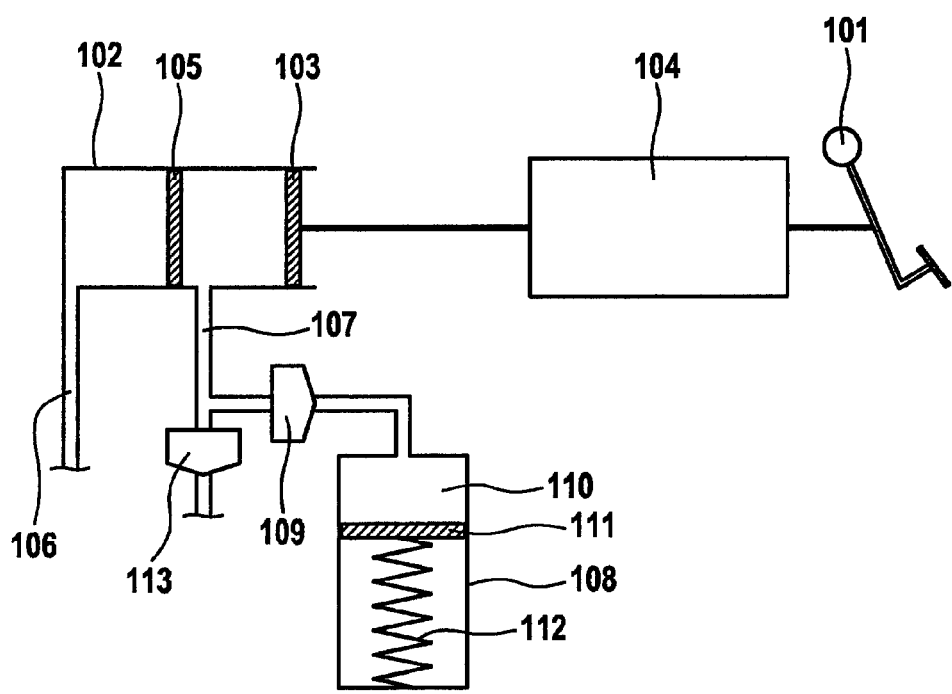
FIG. 1 schematically shows the part of a brake system in which the hydraulic accumulator is integrated, as well as the devices which are necessary for the controlled charging and emptying of the same.

The device according to the present invention is represented in FIG. 1. In response to manipulation by the driver, an actuating element 101 of a brake system, in the form of a brake pedal, is mechanically able to displace a first of two pistons 103 of a tandem master brake cylinder 102. In addition to the braking force exerted by the driver, first piston 103 may be acted upon by an assisting force that is produced by a brake booster 104.

In the exemplary embodiment represented here, the brake booster is a controllable, electromechanical brake booster. In the following, the starting point is a controllable, electromechanical brake booster, which is controlled by a control unit (not drawn in, here) and is able, with the assistance of an electric motor, to exert a force on input piston 103 of tandem master brake cylinder 102. Further specific embodiments of a brake booster, such as a controllable, pneumatic brake booster, are easily conceivable.

A second piston of the tandem master brake cylinder is also displaced by the combination of brake pedal manipulation and brake force amplification. The displacement of pistons 103 and 105 results in the displacement of brake fluid into the brake circuits respectively connected to the two outlets of tandem master brake cylinder 106 and 107.

The volume displaced into the brake circuits produces an increase of pressure in the wheel brake cylinders connected to the brake circuits. The pressure increase at the wheel brake cylinders causes the brake pads to be pressed against the brake disks, and thus, produces a braking action.

In the case of an increased gap between the brake pads and brake disks, it is of interest to compensate for this and to prevent free play in the pedal. For this reason, in a variant of the brake system according to the present invention, a switchable hydraulic accumulator 108 is connected to tandem master brake cylinder 102 at its output side; in the method of the present invention, the switchable hydraulic accumulator being developed and operated in such a manner, that it is able to displace a volume into the at least one, connected brake circuit and thereby build up pressure at the wheel brake cylinders.

In the specific embodiment sketched here, the hydraulic accumulator is connected to outlet 107 of tandem master brake cylinder 102 via a switchable exhaust valve 109. In a preferred exemplary embodiment, valve 409 is a controllable solenoid valve and is controlled by a control unit that is not drawn in, here. The control unit may be separate, as well as provided in the form of the control unit of the brake booster or of a hydraulic accumulator connected to outlets 106 and 107.

In the embodiment sketched here, hydraulic accumulator 108 is made up of a chamber 110, a piston 111, as well as a compressible element 112, which is able to exert a force on the piston, in opposition to the compression, and, thus, to store energy and release it again by displacing the piston.

Of course, other specific embodiments of the hydraulic accumulator are conceivable, for example, a diaphragm-type accumulator, a metallic expansion-bellows accumulator or a piston accumulator.

According to the depicted exemplary embodiment of the present invention, the hydraulic accumulator is charged by brake booster 104, via tandem master brake cylinder 102, when valve 109 is open. In order to prevent the occurrence of a braking action, a valve 113 is provided, which breaks the hydraulic connection between the tandem brake master cylinder and the wheel brakes while the accumulator is charged. This valve may either be additionally integrated into the brake circuit as a component, or be already integrated, thus, e.g., in the form of intake valves at the individual wheel brakes. The volume of brake fluid is held in the accumulator by closing valve 109, and discharged by reopening valve 109. In this context, in some instances, the valve position of the intake valves of a connected hydraulic unit is to be taken into consideration.

In the first specific embodiment of the present invention, the switchable hydraulic accumulator is operated to reduce the gap at at least one wheel brake of a brake system.

To that end, in a first step, while the driver is not braking, the input piston 103 of tandem master brake cylinder 102 is displaced by actuation of brake booster 104; and consequently, when valve 109 is open and input valves of the hydraulic unit (not drawn in) are closed, a volume of brake fluid is displaced out of outlets 106 and 107, into the hydraulic accumulator. This causes compression of compressible element 112, and the accumulator receives brake fluid. As soon as the accumulator is filled, valve 109 is closed. Brake booster 104 is reset and is therefore available for braking.

The level of the accumulator pressure and, therefore, the fluid level of the accumulator may be measured by a pressure sensor already present, such as the inlet pressure sensor or the brake-circuit pressure sensor.

The decision of when/if the accumulator is charged/may be charged may be linked, for example, to the accelerator position. If the accelerator position exceeds a limiting value, then the accumulator is charged.

For the braking feel, it is important to maintain the relationship between pedal travel and total braking torque of the vehicle, regardless of the gap present at the start of the braking. To that end, in the case of braking by the driver, directly after a manipulation of the brake pedal by the driver is sensed and the connection of the master brake cylinder to the reservoir (not drawn in) is thereby broken, valve 109 is opened, and accumulator 108 displaces a volume of brake fluid into the brake system and, in this manner, provides for a pressure increase at the wheel brake cylinders, which results in an at least partial reduction of the gap.

In order to reduce the gap completely, a suitable amount of brake fluid from the hydraulic accumulator must be introduced into the brake system. Valve 109 is left open until contact of the brake pads with the disks is detected. This contact may be detected in light of a pressure increase characteristic of the contact of the brake pads.

A further option for detecting the contact is available in the case of braking with the aid of the electromechanical brake booster, by detecting a characteristic increase in the motor load torque of the servomotor of the brake booster as a function of the pedal travel.

The pressure increase may be determined by a pressure sensor in at least one brake circuit of the hydraulic system, the brake circuit being connected to the hydraulic accumulator.

The pedal travel may be ascertained with the aid of a pedal-travel sensor, or using the motor position of the servomotor of the brake booster. The motor load torque may be derived, for example, from the motor current and/or from the rotational speed of the motor. In the case of speed control or position control of the motor, the current increases proportionally to the motor load torque; in the case of current control or torque control, a higher motor load torque results in a lower rotational speed of the motor.

Of course, other methods of detecting the contact are conceivable.

As soon as contact of the brake pads with the brake disks is detected, valve 109 is closed.

Consequently, it is ensured:
that the introduction of the volume of brake fluid from the hydraulic accumulator to reduce the gap does not trigger a braking action, or triggers only a slight braking action;

that a brake pressure higher than that desired by the driver (through the pedal actuation selected by him or her) is not set at the wheel brake cylinders; and that therefore, the driver senses the desired relationship between pedal travel and total braking torque.

It is equally possible to close the valve when the driver lowers the position of the brake pedal.

In an alternative embodiment of the method according to the present invention, the hydraulic accumulator is emptied to increase the dynamic braking response, thus, for example, in the case of automatic emergency braking without driver participation, or in the case of braking with the aid of a braking assistance function, e.g., initiating full braking on the basis of rapid brake pedal actuation by the driver. To that end, valve 109 is controlled in such a manner, that it is opened and the hydraulic accumulator releases a volume of brake fluid. In order to supply the displaced volume from the accumulator to the connected brake circuit, valve 113 is opened. In the case of such braking, the brake pressure is increased with the aid of the controllable brake booster, with the aid of the pressure build-up via the volume injection of the hydraulic accumulator, as well as, optionally, with the aid of an active pressure build-up of a traction control system.

Valve 109 remains open until the accumulator pressure is lower than the pressure in the brake circuit. The accumulator pressure may either be measured by an additional sensor or calculated from the starting pressure (after charging) and the valve opening time.

Irrespective of the application of the method or the purpose of the application, the method is made up of two basic elements, the charging of the hydraulic accumulator, as well as the emptying of the hydraulic accumulator.

Figure 2:
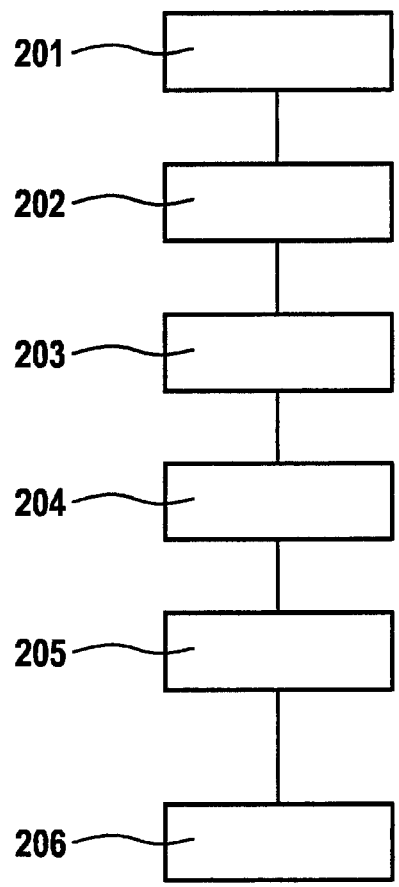
FIG. 2 shows the method steps for charging the hydraulic accumulator.
Figure 3:
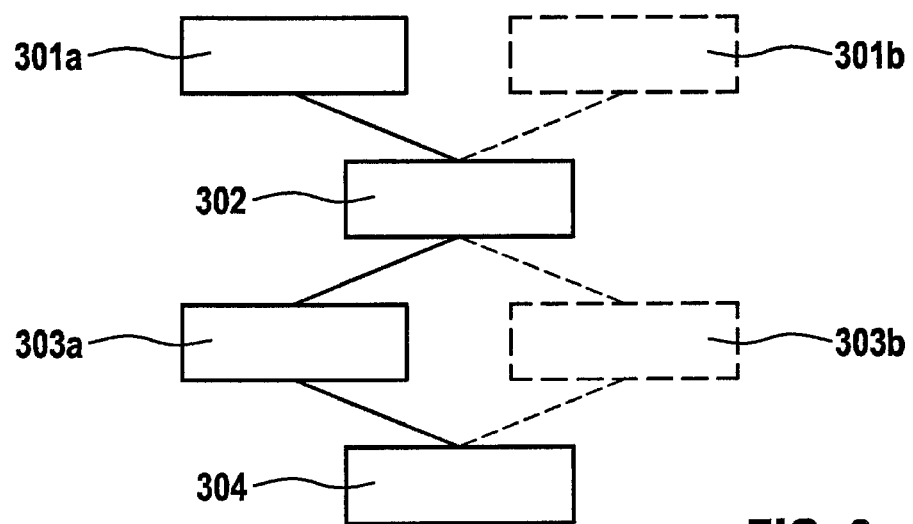
FIG. 3 shows the method steps for emptying the hydraulic accumulator.

In FIGS. 2 and 3, these two main components are exemplarily shown for one brake circuit, but may easily be expanded to two brake circuits.

Charging method, shown in FIG. 2:
201. Closing valve 113
202. Opening valve 109
203. Controlling the brake booster in such a manner, that the input piston of the master cylinder is displaced by brake booster 104, and a volume of brake fluid is thereby displaced into hydraulic accumulator 108
204. Monitoring the pressure build-up in the hydraulic accumulator, using a pressure sensor
205. Closing valve 109 as soon as hydraulic accumulator 108 is charged
206. Resetting brake booster 104.

Emptying method, shown in FIG. 3 (solid line: braking situation; dashed line: emergency braking/braking assistant)
301. Starting situations:
a. Braking Situation: Sensing brake pedal actuation by the driver
b. Braking assistance case/emergency braking
302. Opening valve 113
303. Opening valve 109 up to a break-off condition
a. Accumulator pressure<brake circuit pressure
b. Detection of contact of the brake pads
304. Closing valve 109

As an alternative to step 204, during the charging, although it is not shown graphically, if the pressure sensor is situated on the side of valve 113 facing away from the accumulator, in a first substep, the starting pressure may be recorded, in a second substep, valve 113 is closed, and in a third substep, by controlling the travel of brake booster 104, a volume is injected until the accumulator is full. In this alternative, the fluid level may be ascertained with the aid of the starting pressure and a pressure-versus-volume characteristic curve of the accumulator.

What is claimed is:

1. A method of displacing and storing brake fluid for a hydraulic brake system of a vehicle, the brake system having at least one hydraulic accumulator, at least one controllable brake booster and at least one brake circuit, comprising:
automatically actuating the brake booster to displace the brake fluid into the hydraulic accumulator and store the brake fluid in the hydraulic accumulator; and
selectively emptying, by the hydraulic accumulator, at least a portion of the stored brake fluid into the brake circuit as a function of the operating state of the brake system;
wherein the brake circuit includes at least one wheel brake having a gap between a brake pad and a brake disk, and at least a portion of the stored brake fluid is emptied by the hydraulic accumulator into the brake circuit to reduce the gap between the brake pad and the brake disk;
wherein the gap is reduced until a characteristic increase in a variable representing a load of the brake booster is detected.

2. The method as recited in claim 1, wherein a first interrupting device is provided, and wherein in a closed state of the first interrupting device, the brake pressure in the at least one brake circuit is independent of the actuation of the brake booster, and wherein the first interrupting device is open during the emptying of the at least a portion of the stored brake fluid into the brake circuit.

3. The method as recited in claim 1, wherein the at least a portion of the stored brake fluid is emptied by the hydraulic accumulator into the brake circuit to increase the dynamics of pressure build-up in the brake circuit.

4. The method as recited in claim 1, wherein the displacing of the brake fluid into the hydraulic accumulator takes place as a function of a position of an accelerator pedal.

5. The method as recited in claim 1, wherein the displacing of brake fluid into the hydraulic accumulator takes place as a function of a measured accumulator pressure.

6. The method as recited in claim 1, wherein the emptying takes place at least one of:
(i) on the basis of driver behavior including changing at least one of a position of a brake pedal and a position of an accelerator pedal; and
(ii) on the basis of a driving situation including one of (a) in the case of automated braking assistance, the brake pressure exceeding a predetermined pressure corresponding to the brake pedal position, or (b) an emergency braking.

7. A method of displacing and storing brake fluid for a hydraulic brake system of a vehicle, the brake system having at least one hydraulic accumulator, at least one controllable brake booster and at least one brake circuit, comprising:
automatically actuating the brake booster to displace the brake fluid into the hydraulic accumulator and store the brake fluid in the hydraulic accumulator; and
selectively emptying, by the hydraulic accumulator, at least a portion of the stored brake fluid into the brake circuit as a function of the operating state of the brake system;
wherein a first interrupting device is provided, and wherein in a closed state of the first interrupting device, the brake pressure in the at least one brake circuit is independent of the actuation of the brake booster, and wherein the first interrupting device is open during the emptying of the at least a portion of the stored brake fluid into the brake circuit;

wherein a second interrupting device is provided, and wherein opening of the second interrupting device provides a hydraulic connection between the at least one brake circuit and the hydraulic accumulator, and wherein the second interrupting device is opened during the emptying of the at least a portion of the stored brake fluid into the brake circuit, and wherein the second interrupting device is closed when not emptying the at least a portion of the stored brake fluid into the brake circuit.

8. A device for displacing and storing brake fluid for a hydraulic brake system of a vehicle having at least one hydraulic accumulator, at least one brake booster, and at least one brake circuit, comprising:

at least one interrupting device connected to the hydraulic brake system and configured to enable (i) automatic actuation of the brake booster to displace the brake fluid into the hydraulic accumulator and store the brake fluid in the hydraulic accumulator, and (ii) selective emptying, by the hydraulic accumulator, of at least a portion of the stored brake fluid into the brake circuit as a function of the operating state of the brake system;

wherein the brake circuit includes at least one wheel brake having a gap between a brake pad and a brake disk, and at least a portion of the stored brake fluid is emptied by the hydraulic accumulator into the brake circuit to reduce the gap between the brake pad and the brake disk, wherein the gap is reduced until a characteristic increase in a variable representing a load of the brake booster is detected.

9. The device as recited in claim 8, wherein a first interrupting device is provided, and wherein in a closed state of the first interrupting device, the brake pressure in the at least one brake circuit is independent of the actuation of the brake booster, and wherein the first interrupting device is open during the emptying of the at least a portion of the stored brake fluid into the brake circuit.

10. The device as recited in claim 8, wherein the brake booster is an electromechanically controlled brake booster.

11. A device for displacing and storing brake fluid for a hydraulic brake system of a vehicle having at least one hydraulic accumulator, at least one brake booster, and at least one brake circuit, comprising:

at least one interrupting device connected to the hydraulic brake system and configured to enable (i) automatic actuation of the brake booster to displace the brake fluid into the hydraulic accumulator and store the brake fluid in the hydraulic accumulator, and (ii) selective emptying, by the hydraulic accumulator, of at least a portion of the stored brake fluid into the brake circuit as a function of the operating state of the brake system;

wherein a first interrupting device is provided, and wherein in a closed state of the first interrupting device, the brake pressure in the at least one brake circuit is independent of the actuation of the brake booster, and wherein the first interrupting device is open during the emptying of the at least a portion of the stored brake fluid into the brake circuit;

wherein a second interrupting device is provided, and wherein opening of the second interrupting device provides a hydraulic connection between the at least one brake circuit and the hydraulic accumulator, and wherein the second interrupting device is opened during the emptying of the at least a portion of the stored brake fluid into the brake circuit, and wherein the second interrupting device is closed when not emptying the at least a portion of the stored brake fluid into the brake circuit.

* * * * *